United States Patent
Yokota

(10) Patent No.: US 11,119,319 B2
(45) Date of Patent: Sep. 14, 2021

(54) RENDERING DEVICE, HEAD-MOUNTED DISPLAY, IMAGE TRANSMISSION METHOD, AND IMAGE CORRECTION METHOD

(71) Applicant: SONY INTERACTIVE ENTERTAINMENT INC., Tokyo (JP)

(72) Inventor: Kenichiro Yokota, Tokyo (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 16/630,225

(22) PCT Filed: Jul. 26, 2018

(86) PCT No.: PCT/JP2018/028107
§ 371 (c)(1),
(2) Date: Jan. 10, 2020

(87) PCT Pub. No.: WO2019/026765
PCT Pub. Date: Feb. 7, 2019

(65) Prior Publication Data
US 2020/0132996 A1 Apr. 30, 2020

(30) Foreign Application Priority Data
Aug. 2, 2017 (JP) ............................. JP2017-150052

(51) Int. Cl.
*G02B 27/01* (2006.01)
*G06F 3/01* (2006.01)

(52) U.S. Cl.
CPC ....... *G02B 27/017* (2013.01); *G02B 27/0101* (2013.01); *G06F 3/013* (2013.01);
(Continued)

(58) Field of Classification Search
None
See application file for complete search history.

(56) References Cited

U.S. PATENT DOCUMENTS

2016/0282619 A1* 9/2016 Oto .................... G06F 3/012
2018/0224935 A1* 8/2018 Thunstrom ............ G09G 3/003

FOREIGN PATENT DOCUMENTS

JP          2008-299669 A     12/2008
JP          2010-39556 A       2/2010
(Continued)

OTHER PUBLICATIONS

English machine translation of Japanese patent publication JP2013003339. (Year: 2013).*

(Continued)

*Primary Examiner* — Nicholas J Lee
(74) *Attorney, Agent, or Firm* — Katten Muchin Rosenman LLP

(57) ABSTRACT

Provided is a head-mounted display 100 for displaying images transmitted from a rendering device 200. An orientation sensor 64 detects an orientation of the head-mounted display 100. An HDMI transmission/reception unit 90 receives frame data of an image to be displayed on the head-mounted display 100 and predicted orientation information of the head-mounted display 100 that is transmitted synchronously with the frame data of the image. A re-projection unit 60 corrects the frame data of the image on the basis of a difference between a latest orientation information detected by the orientation sensor 64 and the predicted orientation information so that the frame data of the image suits a latest orientation of the head-mounted display 100.

7 Claims, 13 Drawing Sheets

(52) U.S. Cl.
CPC .................. *G02B 2027/014* (2013.01); *G02B 2027/0147* (2013.01); *G02B 2027/0187* (2013.01)

(56) References Cited

FOREIGN PATENT DOCUMENTS

| | | |
|---|---|---|
| JP | 2013-3339 A | 1/2013 |
| JP | 2017-022717 A | 1/2017 |
| JP | 2017-517025 A | 6/2017 |
| WO | 2015/068656 A1 | 5/2015 |
| WO | 2015/153165 A1 | 10/2015 |

OTHER PUBLICATIONS

International Search Report and Written Opinion dated Oct. 23, 2018, from International Application No. PCT/JP2018/028107, 8 sheets.
International Preliminary Report on Patentability dated Feb. 13, 2020, from International Application No. PCT/JP2018/028107, 14 sheets.
Notice of Reasons for Refusal dated Nov. 4, 2020, from Japanese Patent Application No. 2017-150052, 2 sheets.

\* cited by examiner

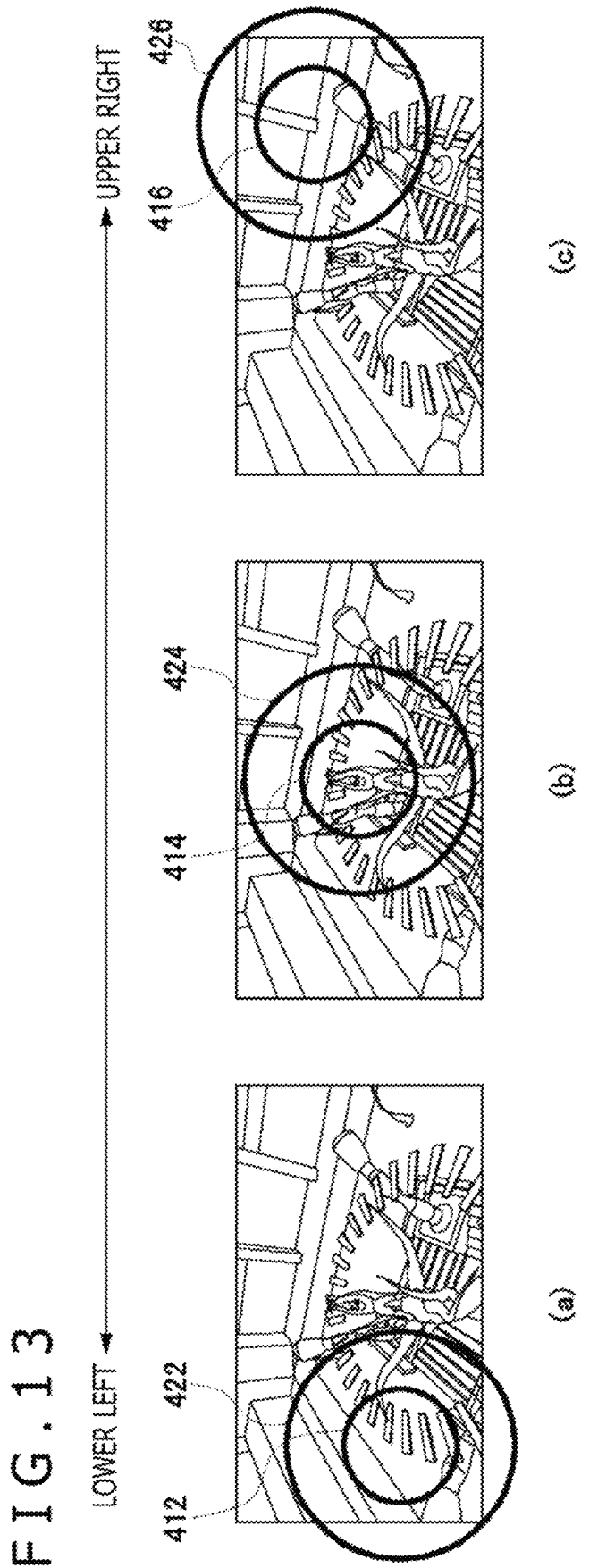

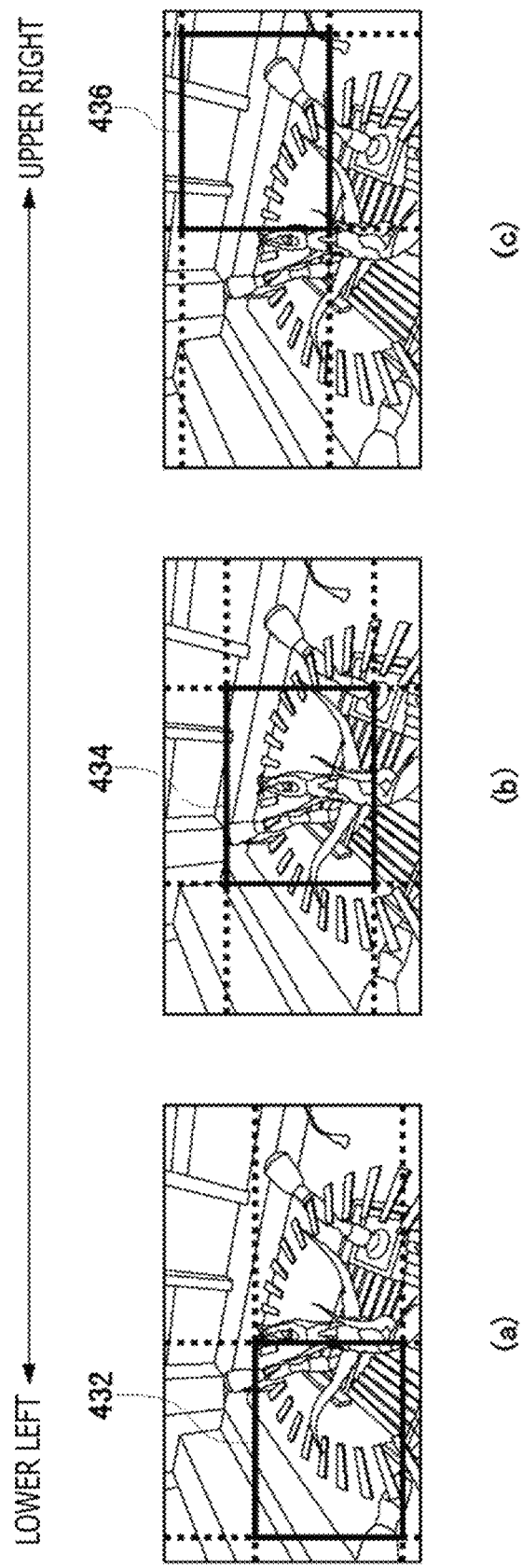

RENDERING DEVICE, HEAD-MOUNTED DISPLAY, IMAGE TRANSMISSION METHOD, AND IMAGE CORRECTION METHOD

TECHNICAL FIELD

The present invention relates to an image transmission technique and an image correction technique for a head-mounted display.

BACKGROUND ART

Playing a game is popularly enjoyed by operating a controller or the like while wearing a head-mounted display connected to a game machine on the head and viewing an image displayed on the head-mounted display. When the head-mounted display is attached, the user sees only the video displayed on the head-mounted display, so that the sense of immersion in the video world is enhanced and thus the entertainment quality of the game is further improved. In addition, if it is configured that virtual reality video is displayed on the head-mounted display and a 360 degree view of an entire circumferential virtual space can be displayed when the user wearing the head-mounted display turns the user's head around, the sense of immersion in the video is further enhanced and the operability of applications such as games is further improved.

SUMMARY

Technical Problem

In this way, when a head-mounted display is provided with a head tracking function and virtual reality video is generated by changing the viewpoint and the visual line direction in conjunction with the movement of the user's head, since a time lag exists from the generation of the virtual reality video until the display thereof, difference occurs between the user's head orientation used as a presupposition at the time of the video generation and the user's head orientation at the time the video is displayed on the head-mounted display, and the user may start to feel motion sickness (called "virtual reality (VR) sickness").

The present invention has been made in view of these problems, and an object thereof is to provide an image transmission technique and an image correction technique for coping with the VR sickness from a head-mounted display.

Solution to Problem

In order to solve the above problems, a rendering device according to an aspect of the present invention includes: a prediction unit that predicts an orientation of a head-mounted display after delay time has elapsed based on orientation information received from the head-mounted display, and outputs predicted orientation information; an image generation unit that generates an image to be displayed on the head-mounted display based on the predicted orientation information of the head-mounted display; and a transmission unit that transmits the predicted orientation information of the head-mounted display to the head-mounted display in synchronization with frame data of the image.

Another aspect of the present invention is a head-mounted display. This head-mounted display is one for displaying an image transmitted from a rendering device and includes: a sensor that detects orientation information of the head-mounted display; a reception unit that receives frame data of an image to be displayed on the head-mounted display and predicted orientation information of the head-mounted display transmitted in synchronization with the frame data of the image; and a re-projection unit that corrects the frame data of the image so that the frame data suits a latest orientation of the head-mounted display based on a difference between latest orientation information detected by the sensor and the predicted orientation information.

Yet another aspect of the present invention is an image transmission method. This method includes: a prediction step of predicting an orientation of a head-mounted display after delay time has elapsed based on orientation information received from the head-mounted display to output predicted orientation information; an image generation step of generating an image to be displayed on the head-mounted display based on the predicted orientation information of the head-mounted display; and a transmission step of transmitting the predicted orientation information of the head-mounted display to the head-mounted display in synchronization with frame data of the image.

Further, another aspect of the present invention is an image correction method. This method is one for correcting an image transmitted from a rendering device and to be displayed on a head-mounted display and includes: a reception step of receiving frame data of an image to be displayed on the head-mounted display and predicted orientation information of the head-mounted display transmitted in synchronization with the frame data of the image; a detection step of detecting latest orientation information of the head-mounted display; and a re-projection step of correcting the frame data of the image so that the frame data suits a latest orientation of the head-mounted display based on a difference between the latest orientation information and the predicted orientation information.

Still further, another aspect of the present invention is also an image correction method. This method is one for performing re-projection on an image by transmitting the image from a rendering device to a head-mounted display and includes: a transmission step of transmitting information used as a presupposition when the rendering device draws the image to be displayed on the head-mounted display and necessary for re-projection in the head-mounted display to the head-mounted display in synchronization with frame data of the image; and a re-projection step of correcting the frame data of the image by the head-mounted display by applying information that is transmitted in synchronization with the frame data of the image and is necessary for the re-projection to the frame data of the image.

It should be noted that any combination of the above-described constituent elements and the expression of the present invention converted between a method, device, system, computer program, data structure, recording medium, etc. are also effective as an aspect of the present invention.

Advantageous Effect of Invention

According to the present invention, it is possible to cope with the VR sickness of a head-mounted display.

BRIEF DESCRIPTION OF DRAWINGS

FIGS. 13A to 13C are diagrams illustrating how the position of the gaze area of the foveated rendering changes according to the movement of a gaze point.

FIGS. 14A to 14C are diagrams illustrating how the position of a divided area changes when gaze tracking is combined with the multi-resolution shading.

DESCRIPTION OF EMBODIMENT

Figure 1:
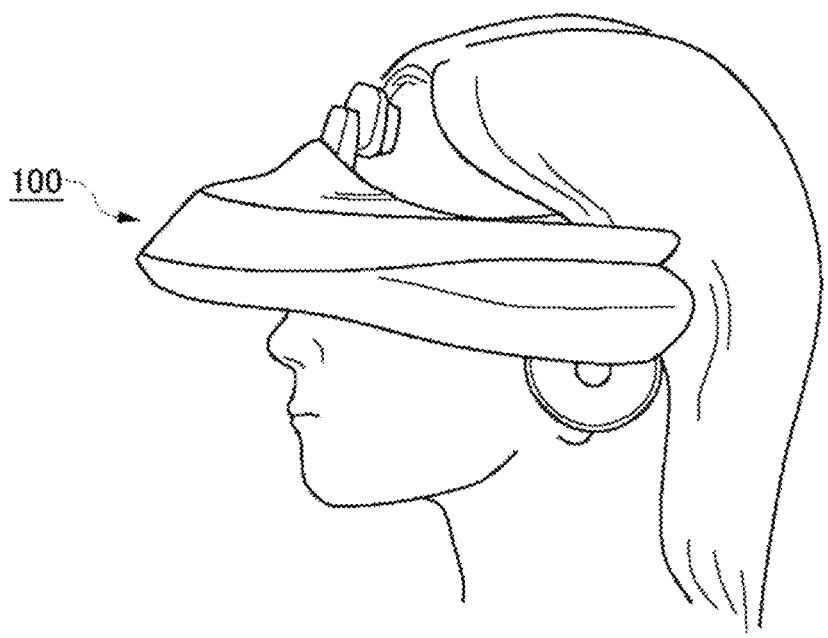
FIG. 1 is an external view of a head-mounted display.

FIG. 1 is an external view of a head-mounted display 100. The head-mounted display 100 is a display device to be used for enjoying still images and moving images displayed on the display and for listening to audio and music output from headphones, while being worn on the user's head.

The position information of the head of the user wearing the head-mounted display 100 and the orientation information such as the rotation angle and inclination of the head can be measured by a gyro sensor or an acceleration sensor built in or externally attached to the head-mounted display 100.

The head-mounted display 100 may further be provided with a camera that captures an image of the user's eyes. The camera mounted on the head-mounted display 100 can detect the user's gaze direction, pupil movement, blinking, and the like.

The head-mounted display 100 is an example of a "wearable display". Here, a method for generating an image displayed on the head-mounted display 100 will be described, but the image generating method according to the present embodiment can also be applied to the cases where glasses, a glasses type display, a glasses type camera, headphones, a headset (headphones with a microphone), earphones, earrings, an ear-mounted camera, a cap, a cap with a camera, a hair band, and the like are worn, without being limited to the head-mounted display 100 in a narrow sense.

Figure 2:
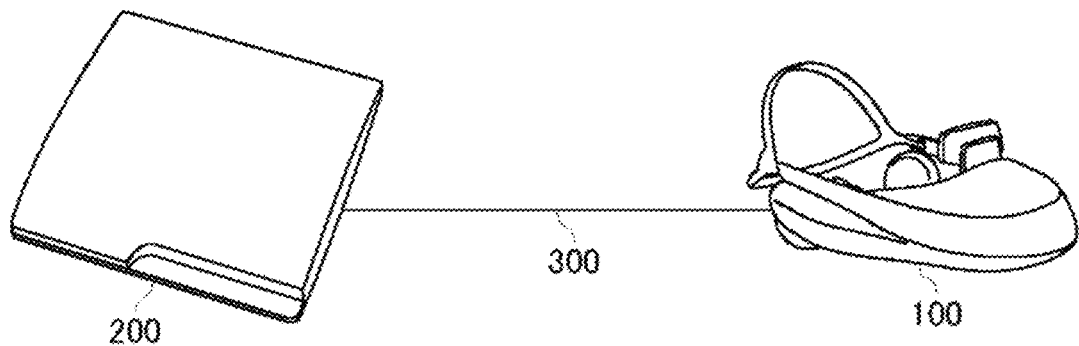
FIG. 2 is a configuration diagram of an image transfer system according to the present embodiment.

FIG. 2 is a configuration diagram of the image transfer system according to the present embodiment. As an example, the head-mounted display 100 is connected to a rendering device 200 through an interface such as a high-definition multimedia interface (HDMI) (registered trademark) which is a standard of a communication interface for transmitting video and audio as digital signals.

In the present embodiment, a data transmission path 300 between the head-mounted display 100 and the rendering device 200 is an HDMI transmission path.

The HDMI 2.1 standard has a function called a high dynamic range (HDR), which refers to the dynamic metadata of video and can generate video for which the luminance and color depth are adjusted optimally for each frame according to the scene. In the HDMI 2.1 standard, dynamic metadata can transmit information necessary for a dynamic HDR such as maximum luminance, average luminance, and minimum luminance of a scene in synchronization with video.

In the present embodiment, the rendering device 200 predicts the position-orientation information of the head-mounted display 100 in consideration of the delay time from the generation of video to the display thereof, and causes the predicted position-orientation information of the head-mounted display 100 used as a presupposition at the time of making an image to be included in the dynamic metadata, thereby transmitting the dynamic metadata to the head-mounted display 100 in synchronization with the video frame data.

The communication interface between the head-mounted display 100 and the rendering device 200 is not limited to the HDMI as long as dynamic metadata can be transmitted in synchronization with video.

An example of the rendering device 200 is a game machine. The rendering device 200 may be further connected to a server via a network. In that case, the server may provide the rendering device 200 with an online application such as a game in which a plurality of users can participate via a network. The head-mounted display 100 may be connected to a computer or a portable terminal instead of the rendering device 200.

The video displayed on the head-mounted display 100 may be video based on computer graphics such as a game video in addition to video images previously captured by a camera. Further, the video may be live video of a remote place distributed via a network.

Figure 3:
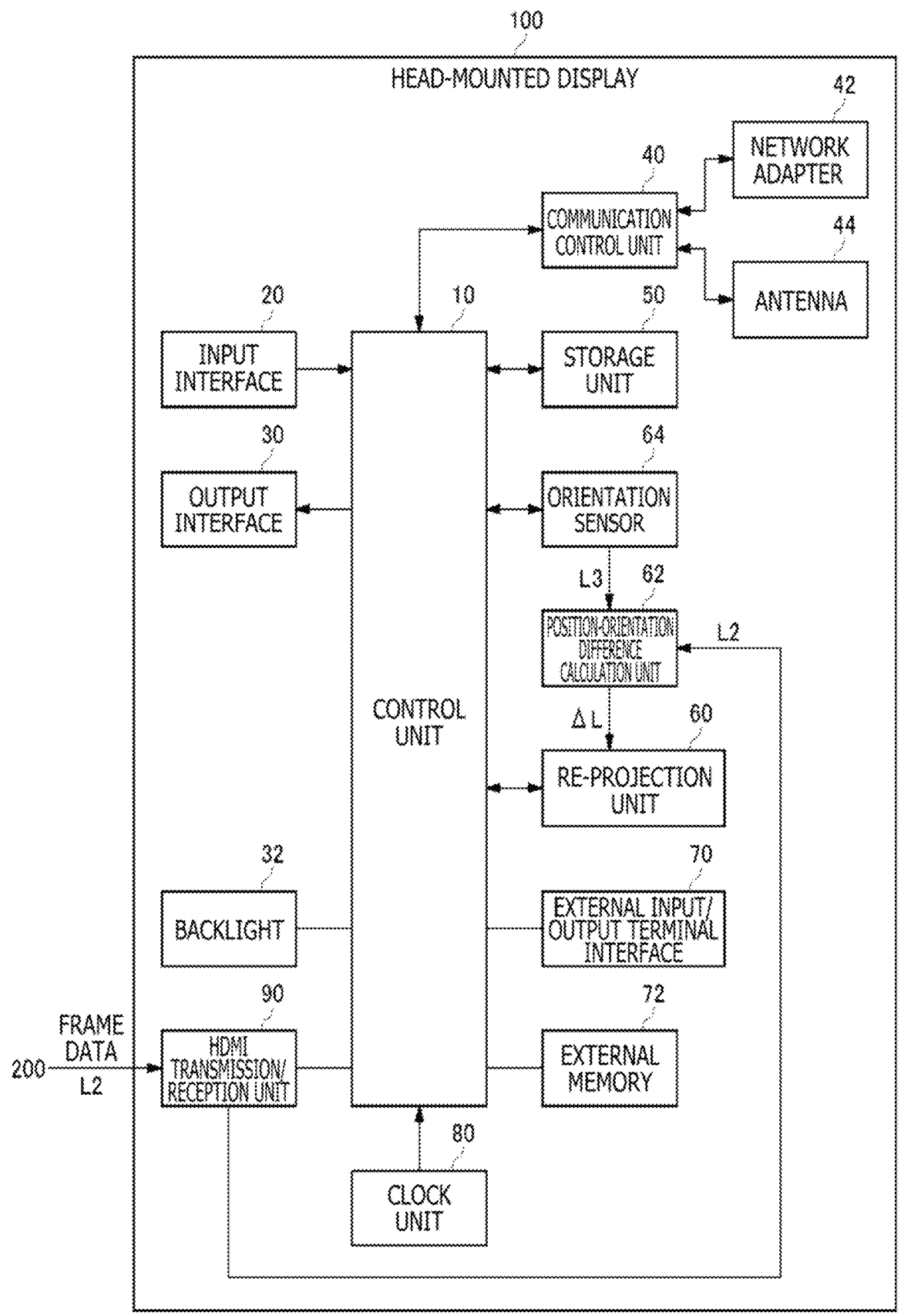
FIG. 3 is a functional configuration diagram of the head-mounted display.

FIG. 3 is a functional configuration diagram of the head-mounted display 100.

A control unit 10 is a main processor that processes and outputs signals such as image signals and sensor signals, commands, and data. An input interface 20 receives operation signals and setting signals from the user and supplies the signals to the control unit 10. An output interface 30 receives the image signal from the control unit 10 and displays the image on the display. A backlight 32 supplies backlight to the liquid crystal display.

A communication control unit 40 transmits data input from the control unit 10 to the outside through wired or wireless communication via a network adapter 42 or an antenna 44. The communication control unit 40 also receives data from the outside through wired or wireless communication via the network adapter 42 or the antenna 44 and outputs the data to the control unit 10.

A storage unit 50 temporarily stores data, parameters, operation signals, and the like processed by the control unit 10.

An external input/output terminal interface 70 is an interface for connecting peripheral equipment such as a universal serial bus (USB) controller. An external memory 72 is an external memory such as a flash memory.

A clock unit 80 sets time information according to a setting signal from the control unit 10 and supplies time data to the control unit 10.

An HDMI transmission/reception unit 90 transmits or receives video-audio digital signals according to the HDMI. Dynamic metadata is associated with the frame data received by the HDMI transmission/reception unit 90 from the rendering device 200, and the dynamic metadata includes predicted position-orientation information L2 of the head-mounted display 100 that the rendering device 200 uses as a presupposition when making an image by the frame data.

The control unit 10 can supply the image and text data to the output interface 30 for display thereof on the display or to the communication control unit 40 for transmission thereof to the outside.

An orientation sensor 64 detects position information of the head-mounted display 100 and orientation information such as the rotation angle and inclination of the head-mounted display 100. The orientation sensor 64 is obtained by appropriately combining a gyro sensor, an acceleration sensor, an angular acceleration sensor, and the like. A back-and-forth, right-and-left and up-and-down movement of the user's head may be detected by using a motion sensor obtained by combining at least one of a three-axis geomagnetic sensor, a three-axis acceleration sensor, and a three-axis gyro (angular velocity) sensor.

The rendering device 200 is notified of current position-orientation information L1 of the head-mounted display 100 detected by the orientation sensor 64 via the communication control unit 40 or the external input/output terminal interface 70. Alternatively, the HDMI transmission/reception unit 90 may transmit the current position-orientation information L1 of the head-mounted display 100 to the rendering device 200. The rendering device 200 predicts the position-orientation information of the head-mounted display 100 from the received current position-orientation information L1 of the head-mounted display 100 in consideration of the delay time from the generation of the video to the display thereof, and draws the image to be displayed on the head-mounted display 100 using the predicted position-orientation information L2 of the head-mounted display 100 as a presupposition.

At the time of reception of the image drawn data from the rendering device 200, the orientation sensor 64 detects latest position-orientation information L3 of the head-mounted display 100, and gives the information to a position-orientation difference calculation unit 62. The position-orientation difference calculation unit 62 receives the predicted position-orientation information L2 used as a presupposition when the rendering device 200 draws an image from the HDMI transmission/reception unit 90. The position-orientation difference calculation unit 62 calculates a difference ΔL between the latest position-orientation information L3 and the predicted position-orientation information L2, and gives the difference ΔL to a re-projection unit 60. Here, note that as for the difference ΔL between the latest position-orientation information L3 and the predicted position-orientation information L2, these pieces of information are generally different in both the position information and the orientation information of the head-mounted display 100, but only one of the position information and the orientation information may be different.

The re-projection unit 60 executes re-projection by applying correction based on the difference ΔL to the image drawn data received by the HDMI transmission/reception unit 90 from the rendering device 200, and gives the re-projected image drawn data to the control unit 10. The control unit 10 supplies the re-projected image drawn data to the output interface 30 for displaying the data on the display.

Figure 4:
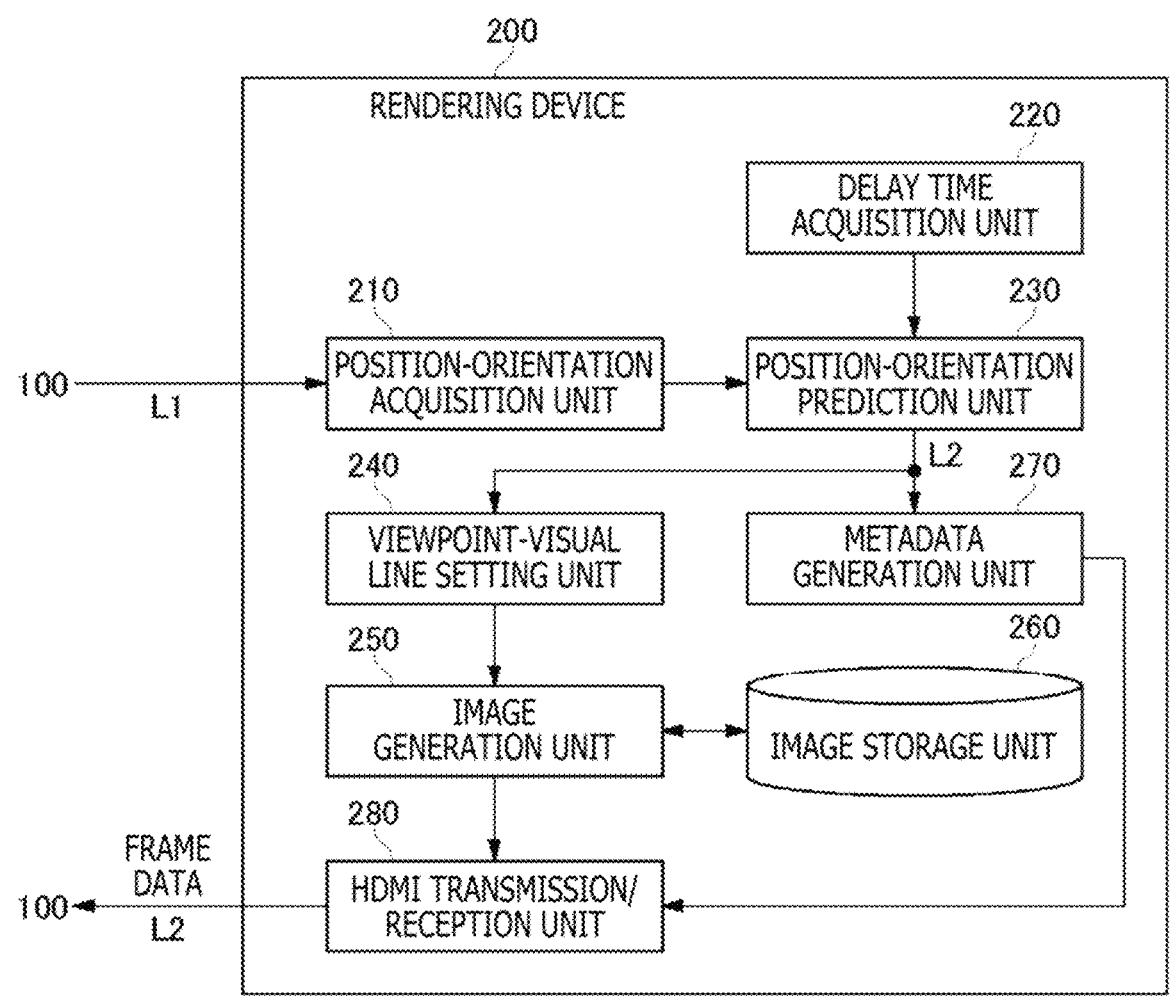
FIG. 4 is a functional configuration diagram of a rendering device according to the present embodiment.

FIG. 4 is a functional configuration diagram of the rendering device 200 according to the present embodiment. This figure illustrates a block diagram focusing on functions, and these functional blocks can be realized in various forms by only hardware, only software, or a combination thereof.

At least a part of the functions of the rendering device 200 may be mounted on the head-mounted display 100. Alternatively, at least a part of the functions of the rendering device 200 may be mounted in a server connected to the rendering device 200 via a network.

A position-orientation acquisition unit 210 acquires the current position-orientation information L1 of the head-mounted display 100 from the head-mounted display 100.

A delay time acquisition unit 220 acquires a delay time required from making an image that is visible in the visual line direction from a viewpoint position at a certain time until display of the image on the head-mounted display 100. This delay time includes not only the time required for the image drawn process but also the time required to transmit the image data. The delay time acquisition unit 220 obtains a delay time based on the three-dimensional image drawn hardware performance and the transmission delay of the transmission path.

A position-orientation prediction unit 230 predicts the amount of change in position and orientation during the delay time obtained by the delay time acquisition unit 220. The position-orientation prediction unit 230 can determine the amount of change in the position and orientation by multiplying the translational velocity and angular velocity of the head of the user wearing the head-mounted display 100 by the delay time. The position-orientation prediction unit 230 predicts the position-orientation information L2 after the lapse of the delay time by adding the change amount of the position and orientation during the delay time to the current position-orientation information L1, and supplies the predicted position-orientation information L2 to a viewpoint-visual line setting unit 240 and a metadata generation unit 270.

The viewpoint-visual line setting unit 240 updates the user's viewpoint position and visual line direction using the predicted position-orientation information L2 of the head-mounted display 100 acquired by the position-orientation prediction unit 230.

An image generation unit 250 reads the image data from an image storage unit 260, and generates an image seen in the visual line direction from the viewpoint position of the user wearing the head-mounted display 100 according to the user's viewpoint position and visual line direction set by the viewpoint-visual line setting unit 240, and gives the image to an HDMI transmission/reception unit 280. Here, the image data may be a moving image or a still image content created in advance, or may be computer graphics subjected to rendering.

The metadata generation unit 270 acquires the predicted position-orientation information L2 from the position-orientation prediction unit 230, embeds the predicted position-orientation information L2 in the dynamic metadata to be associated with the frame data, and supplies the dynamic metadata to the HDMI transmission/reception unit 280.

The HDMI transmission/reception unit 280 receives frame data from the image generation unit 250 and receives dynamic metadata in which the predicted position-orientation information L2 is embedded from the metadata generation unit 270. The HDMI transmission/reception unit 280 synchronizes the dynamic metadata with the frame data according to the HDMI, and transmits the frame data and the dynamic metadata to the head-mounted display 100.

Figure 5:
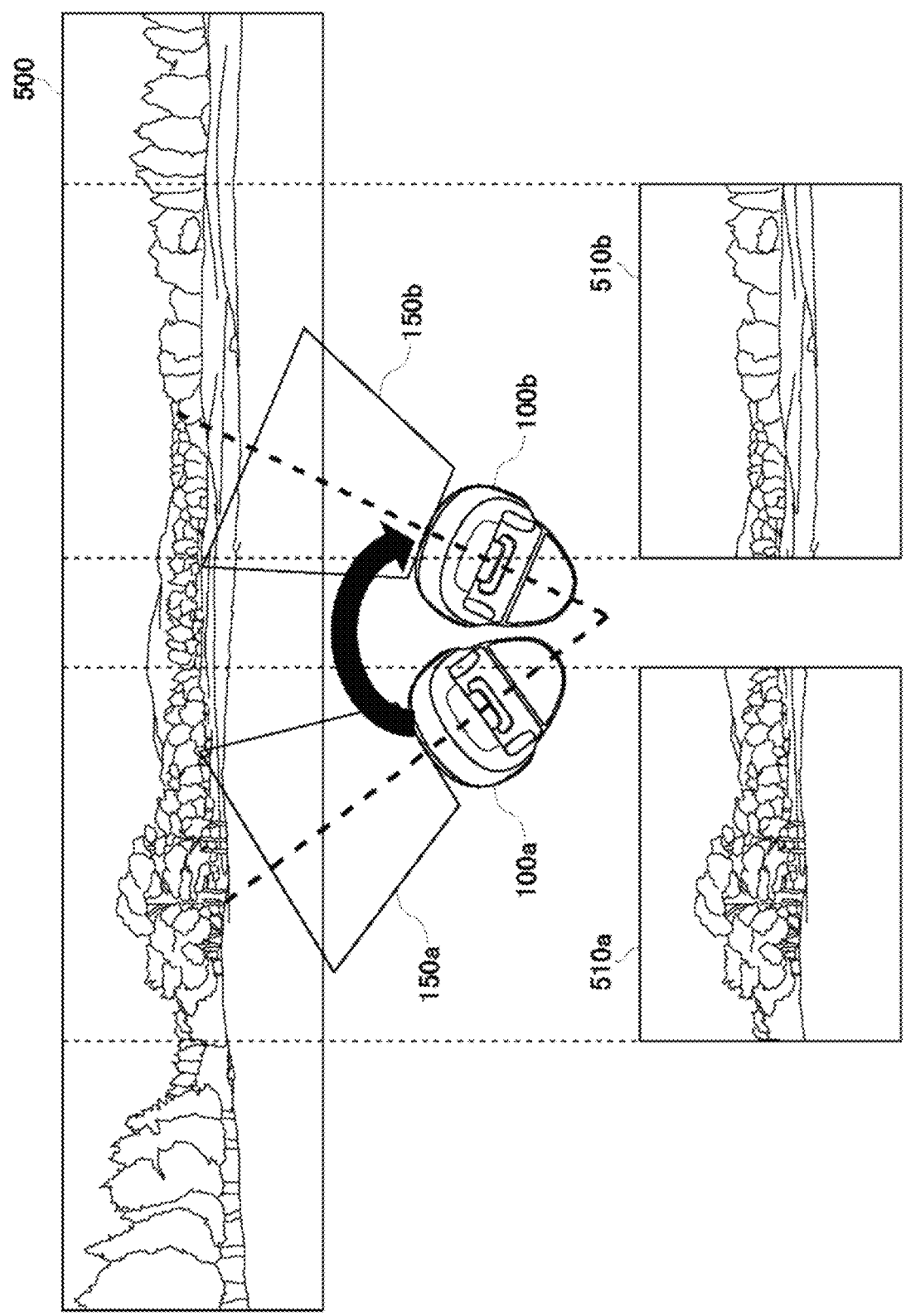
FIG. 5 is a diagram illustrating an entire circumferential image displayed on the head-mounted display.

FIG. 5 is a diagram illustrating an entire circumferential image 500 displayed on the head-mounted display 100. When the user is facing toward the left front with respect to the entire circumferential image 500, an image 510a located in the range of an angle of view 150a in the direction of a head-mounted display 100a is displayed, and when the user is facing toward the right front after turning his/her neck, an image 510b located in the range of an angle of view 150b in the direction of a head-mounted display 100b is displayed.

As described above, since the viewpoint position and the visual line direction for viewing the entire circumferential image displayed on the head-mounted display 100 change according to the movement of the head, the feeling of immersion in the entire circumferential image can be enhanced.

Figure 6:
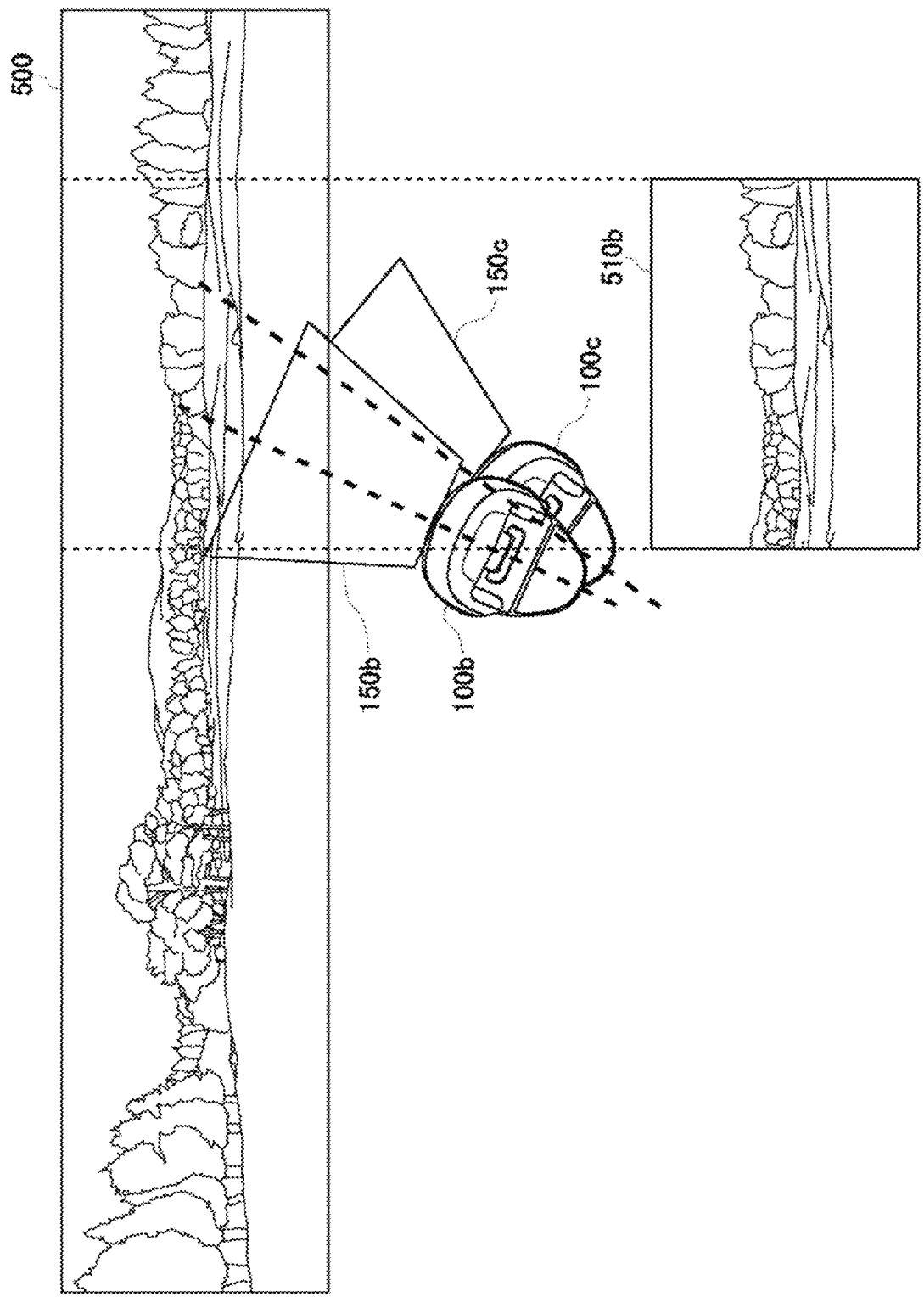
FIG. 6 is a diagram for explaining the reason why a delay occurs in the entire circumferential image displayed on the head-mounted display.

FIG. 6 is a diagram for explaining the reason why the entire circumferential image displayed on the head-mounted display 100 is delayed. When the user turns the user's neck and faces toward the right front, the image 510b located in the range of the angle of view 150b in the direction of the head-mounted display 100b is generated and displayed on the head-mounted display 100, but at the time of displaying the image 510b, the position and rotation of the head-mounted display 100b have already changed as indicated by reference sign 150c. For this reason, although it is necessary to display an image that is supposed to be visible in the range of the angle of view 150c on a head-mounted display 100c, the image actually generated and displayed is an image that is seen in the range of the angle of view 150b in the direction of the head-mounted display 100b, which is an image at a slightly previous time. Due to a deviation from this time lag, an image slightly deviated from one in the direction in which the user is looking is displayed on the head-mounted display 100, and the user may feel some kind of "motion sickness".

In this way, since after the rotation of the head-mounted display 100 is detected, the next image drawn range is determined, and the CPU issues an drawn generation command, and then a GPU executes rendering, it takes time before outputting a generated image to the head-mounted display 100. If image drawing is performed at a frame rate of 60 fps (frames/second), for example, even if the CPU operates at sufficiently high speed, delay time corresponding to one frame has been caused when the image is output after the rotation of the head-mounted display 100 is detected. This is approximately 16.67 milliseconds under a frame rate of 60 fps, which is a sufficient time for humans to detect a deviation.

Further, latency occurs when an image drawn by the rendering device 200 is transmitted to the head-mounted display 100 via the data transmission path 300.

Therefore, a re-projection process is performed on the generated image to make it difficult for humans to detect the deviation. Although image drawing of the rendering device 200 performed by predicting the position-orientation information of the head-mounted display 100 after the delay time has elapsed is one kind of re-projection, image correction in order to compensate for the deviation of the predicted position-orientation information of the head-mounted display 100 which is used as a presupposition when the rendering device 200 draws an image from the latest position-orientation information of the head-mounted display 100 when the image drawn by the rendering device 200 is displayed on the head-mounted display 100 is called re-projection in the present embodiment.

To be specific, this is a process of determining the difference between the predicted position-orientation information of the head-mounted display 100 used as a presupposition when image drawing is performed and the latest position-orientation information of the head-mounted display 100, and correcting an image so that the image suits the latest position-orientation information of the head-mounted display 100, and techniques such as image conversion and frame interpolation are used.

The rendering device 200 transmits information necessary for re-projection to the head-mounted display 100 in synchronization with image frame data as dynamic metadata. Since the rendering device 200 has the predicted position-orientation information of the head-mounted display 100 used as a presupposition when making an image, without transmission of the information as dynamic metadata from the rendering device 200 to the head-mounted display 100 for each frame, the information could not be known by the head-mounted display 100. Therefore, the rendering device 200 embeds the predicted position-orientation information of the head-mounted display 100 in the dynamic metadata, and transmits the dynamic metadata to the head-mounted display 100 in synchronization with the frame data. The predicted position-orientation information of the head-mounted display 100 is an example of data necessary for re-projection, and other information may be embedded in dynamic metadata and transmitted to the head-mounted display 100 if the information is necessary for re-projection.

Here, if dynamic metadata is transmitted separately from frame data, the frame data could not be associated with the dynamic metadata, and the dynamic metadata could not be applied to the frame data. For comparison, referring to FIG. 7, a method for transmitting dynamic metadata separately without associating the metadata with frame data will be described, and then, referring to FIG. 8, a method for transmitting the dynamic metadata while the data is synchronized with frame data will be described.

Figure 7:
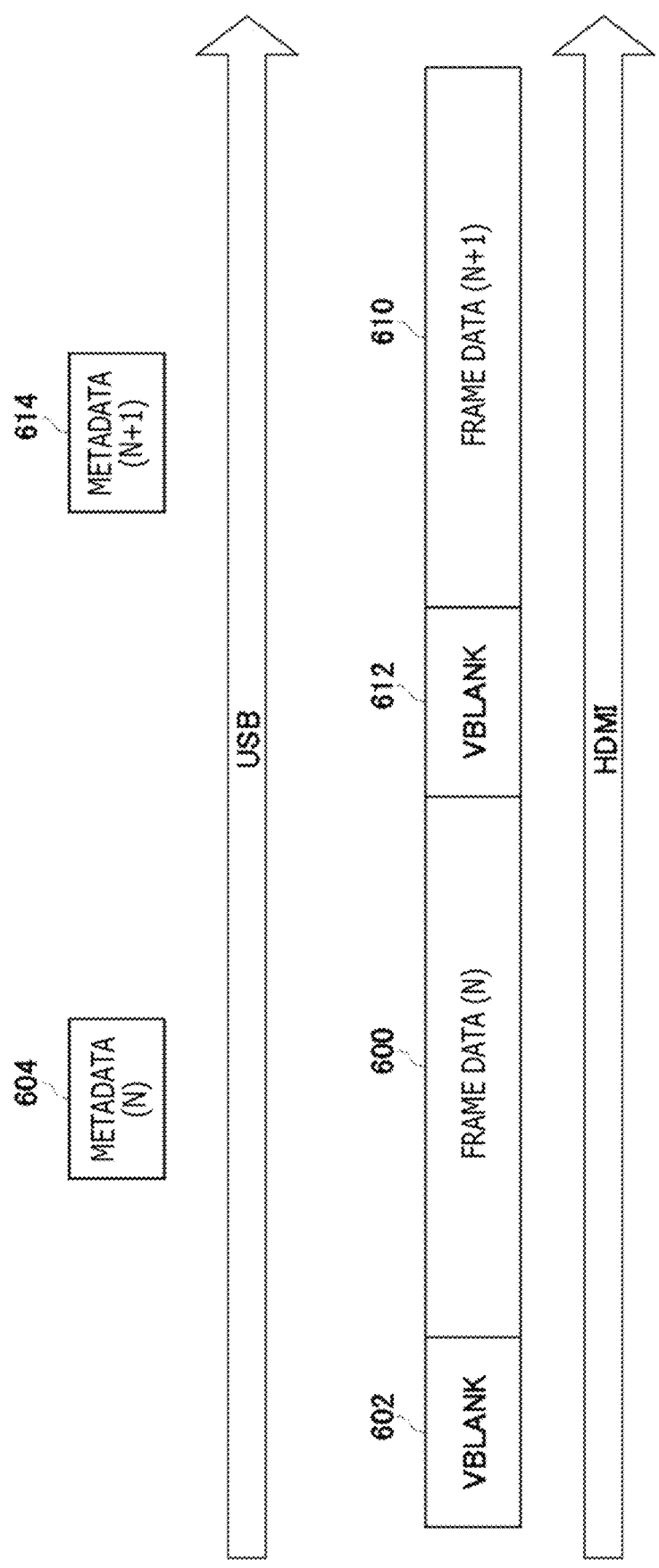
FIG. 7 is a diagram illustrating a method for transmitting dynamic metadata through a transmission path different from that of frame data.

FIG. 7 is a diagram for describing a method for transmitting dynamic metadata through a transmission path different from that of frame data.

Frame data is transmitted through the HDMI transmission path. A vertical blanking signal VBlank is inserted immediately before each frame data. Here, a signal VBlank 602 is inserted immediately before Nth frame data 600, and a signal VBlank 612 is inserted immediately before (N+1)th frame data 610.

As an example, dynamic metadata to be applied to each frame data is transmitted through a USB transmission path. In addition to USB connection, metadata may be transmitted by wireless communication, for example. Nth dynamic metadata 604 to be applied to the Nth frame data 600 and (N+1)th dynamic metadata 614 to be applied to the (N+1)th frame data 610 are transmitted through the USB transmission path, but these pieces of the dynamic metadata 604 and 614 are not synchronized with the frame data 600 and 610. For this reason, even if the head-mounted display 100 receives the dynamic metadata 604 and 614, whether the metadata should be applied to the frame data 600 or 610 is unknown.

Figure 8:
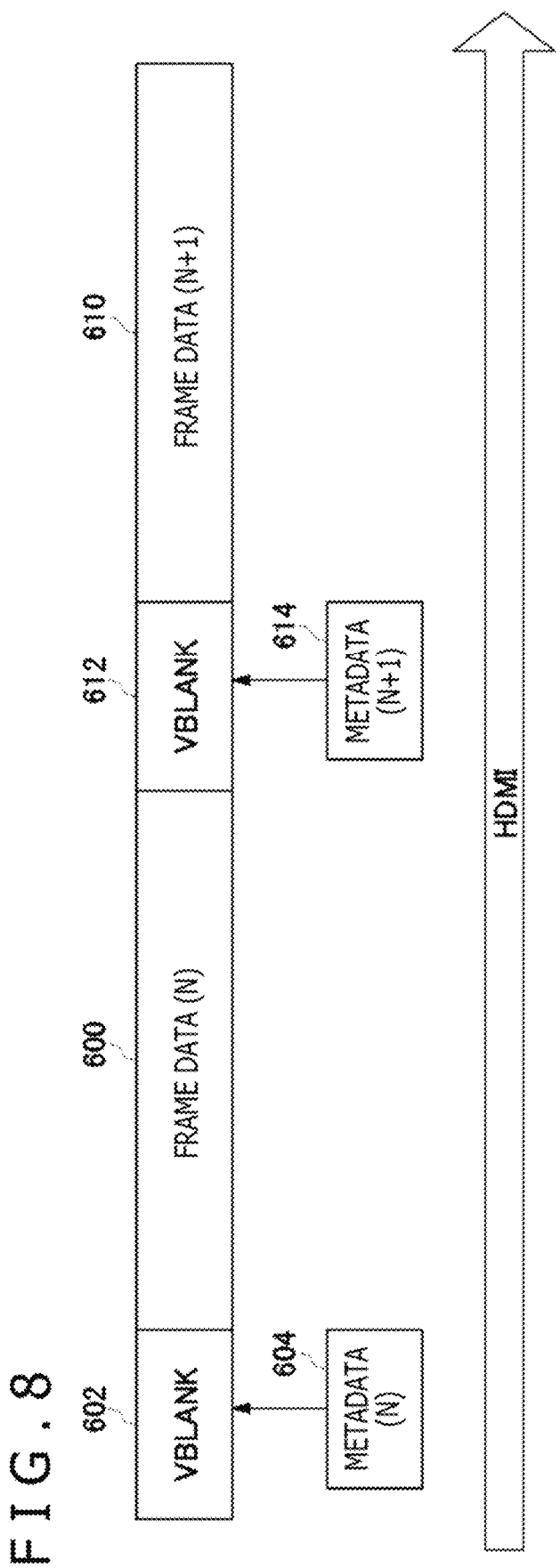
FIG. 8 is a diagram illustrating a method for transmitting dynamic metadata through the same transmission path in synchronization with frame data.

FIG. 8 is a diagram for describing a method for transmitting dynamic metadata through the same transmission path in synchronization with frame data.

Frame data and dynamic metadata are transmitted through the HDMI transmission path. A vertical blanking signal VBlank is inserted immediately before each frame data, and metadata is inserted into the vertical blanking signal VBlank. Here, the signal VBlank 602 is inserted immediately before the Nth frame data 600, and the Nth dynamic metadata 604 is inserted into the signal VBlank 602. Also, the signal VBlank 612 is inserted immediately before the (N+1)th frame data 610, and the (N+1)th dynamic metadata 614 is inserted into the signal VBlank 612.

As described above, when the dynamic metadata 604 and 614 to be applied to the frame data 600 and 610 are inserted into the vertical blanking signals VBlank of the frame data 600 and 610 respectively and transmitted through the same HDMI transmission path, since the dynamic metadata 604 and 614 are synchronized with the frame data 600 and 610 respectively, the head-mounted display 100 can correctly apply the dynamic metadata 604 and 614 to the corresponding frame data 600 and 610 respectively.

In the HDMI 2.1 standard, it is studied to insert dynamic metadata to be applied to each frame in the VBlank signal of each frame data to transmit the metadata. When the predicted position-orientation information of the head-mounted display 100 is embedded in the dynamic metadata, the predicted position-orientation information of the head-mounted display 100 used by the rendering device 200 can be transmitted to the head-mounted display 100 in synchronization with the frame data. Here, an example has been described in which dynamic metadata is inserted into an HDMI 2.1 standard VBlank signal, but this is only an example, and dynamic metadata may be inserted into some synchronization signal synchronized with each frame and transmitted.

Figure 9:
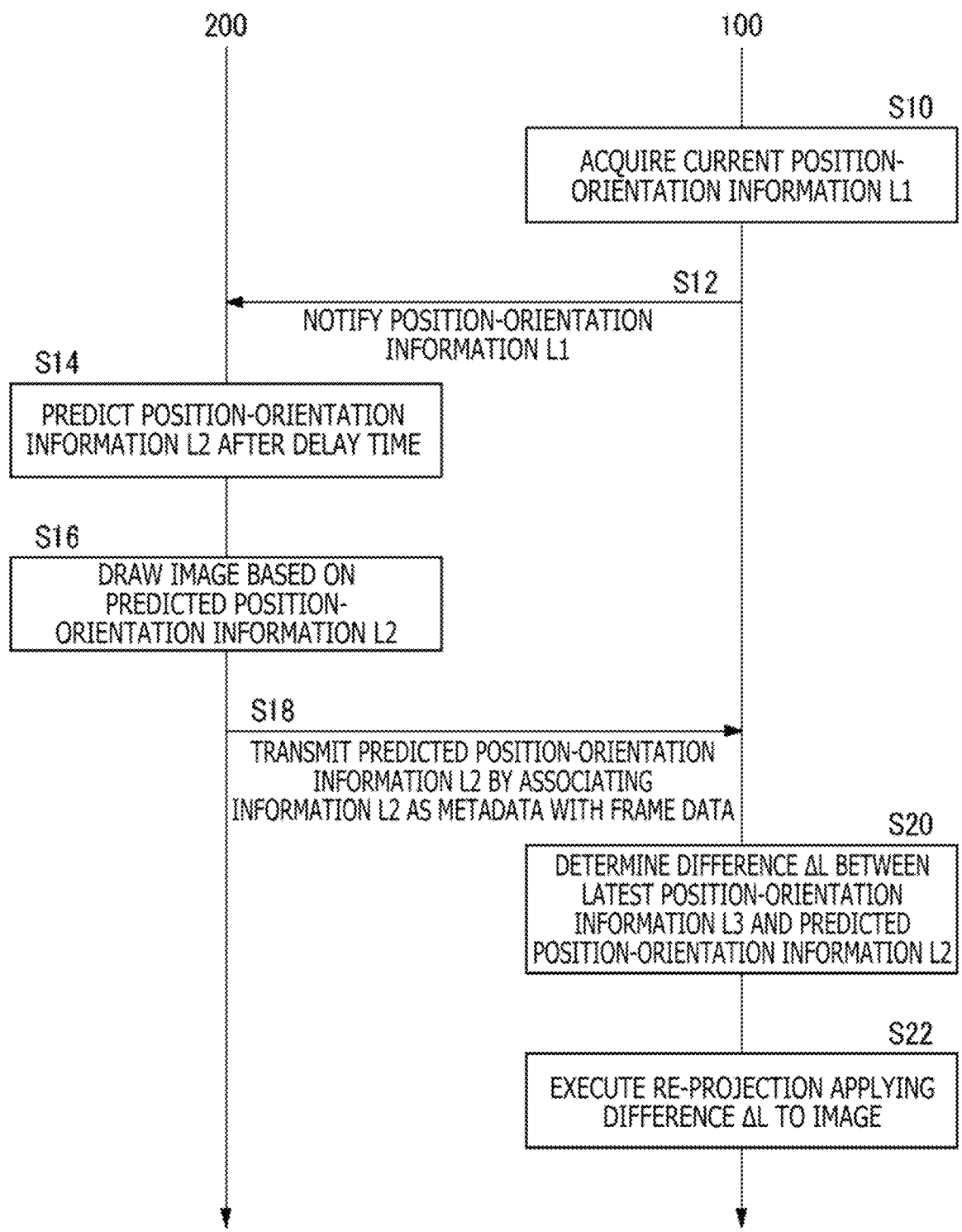
FIG. 9 is a sequence diagram illustrating re-projection processing by the head-mounted display and the rendering device.

FIG. 9 is a sequence diagram for describing the re-projection process performed by the head-mounted display 100 and the rendering device 200.

The orientation sensor 64 of the head-mounted display 100 detects the current position-orientation information L1 of the head-mounted display 100 (S10). The head-mounted display 100 notifies the rendering device 200 of the current position-orientation information L1 (S12).

The rendering device 200 determines a delay time generated by a transmission delay between the head-mounted display 100 and the rendering device 200 and a processing delay for drawing image in the rendering device 200. The position-orientation prediction unit 230 of the rendering device 200 predicts the position-orientation information L2 of the head-mounted display 100 after the delay time has elapsed from the current position-orientation information L1 (S14).

The image generation unit 250 of the rendering device 200 draws an image that is visible to the user wearing the head-mounted display 100, based on the predicted position-orientation information L2 (S16).

The HDMI transmission/reception unit 280 of the rendering device 200 associates the predicted position-orientation information L2 as dynamic metadata with the frame data in which an image has been drawn and transmits the data to the head-mounted display 100 (S18).

When the frame data is received from the rendering device 200, the orientation sensor 64 of the head-mounted display 100 detects the latest position-orientation information L3 of the head-mounted display 100, and the position-orientation difference calculation unit 62 determines the difference ΔL between the latest position-orientation information L3 and the predicted position-orientation information L2 (S20).

The re-projection unit 60 performs re-projection processing on the frame data based on the difference ΔL, and generates an image that suits the latest position-orientation information L3 (S22).

Although the predicted position-orientation information L2 is embedded in the dynamic metadata and transmitted in synchronization with the frame data according to the above description, information necessary for re-projection is embedded in the dynamic metadata and transmitted in general. Hereinafter, other information to be embedded in the dynamic metadata will be described with reference to embodiment using re-projection.

Figure 10:
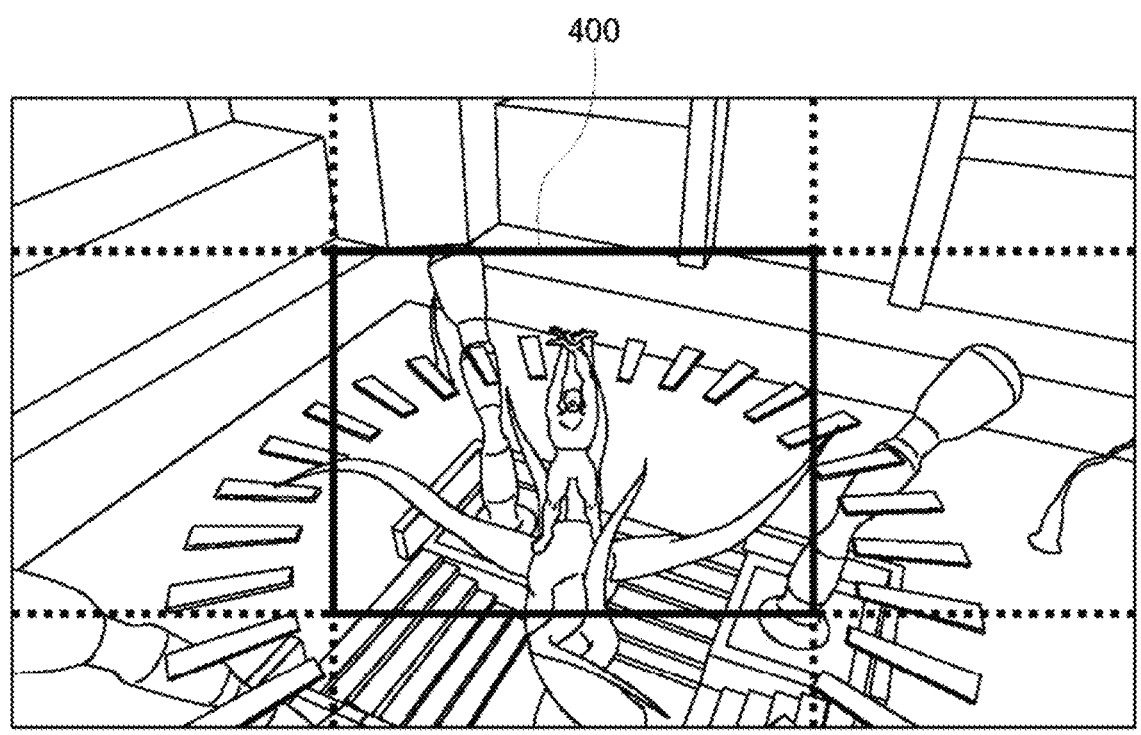
FIG. 10 is a diagram illustrating divided areas of multi-resolution shading.

FIG. 10 is a diagram for illustrating divided areas of multi-resolution shading. When video is displayed on the head-mounted display 100, it is necessary to correct the lens distortion of the image, and the resolution is maintained in the central area of the image, but the area at the end of the visual field is compressed and the resolution is lowered. Therefore, there is a method called the multi-resolution shading that performs image drawing in a central area 400 of the image with high resolution and in the other peripheral areas with low resolution to reduce the load of the image drawn process. In the head-mounted display 100, although the multi-resolution shading is performed on each left-eye image and right-eye image, here the image of one eye is illustrated.

The rendering device 200 transmits an image drawn by the multi-resolution shading to the head-mounted display 100, and the re-projection unit 60 of the head-mounted display 100 executes re-projection on the image in accordance with the latest position-orientation information L3. When executing re-projection on an image, the head-mounted display 100 needs to know how the image has been divided to be drawn at a plurality of resolutions in the multi-resolution shading. This is because the difference in resolution for each divided area must be taken into account when re-projecting the image.

Therefore, the rendering device 200 causes information associated with the divided areas in the multi-resolution shading to be included in the dynamic metadata in addition to the predicted position-orientation information L2, and transmits the information to the head-mounted display 100 in synchronization with the frame data.

Figure 11:
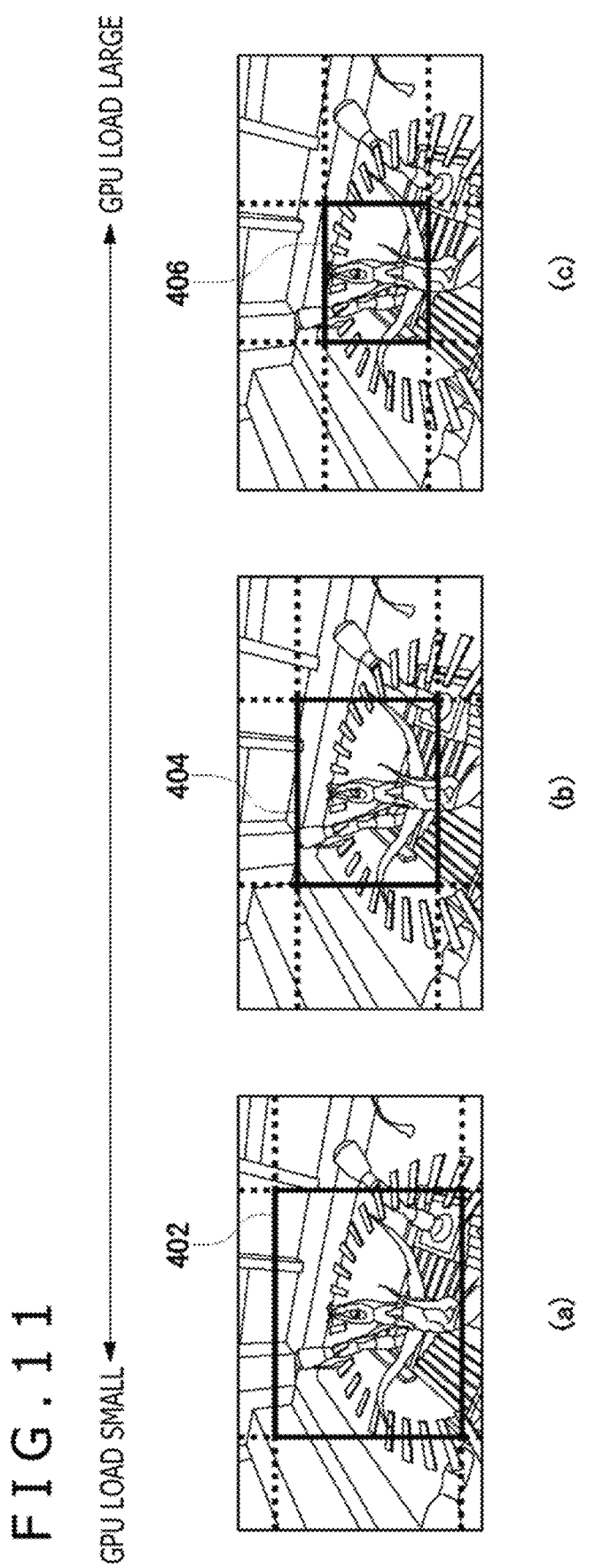
FIGS. 11(a) to 11(c) are diagrams illustrating how the size of the divided area of the multi-resolution shading changes according to the load of a graphics processing unit (GPU).

FIGS. 11(a) to 11(c) are diagrams for describing how the size of the divided area for the multi-resolution shading changes according to the load of the GPU. When the GPU load is small, a central area where an image is drawn with a high resolution is widened (reference sign 402) as illustrated in FIG. 11(a), but as the GPU load increases, the central area 402 is narrowed (reference signs 404 and 406) as illustrated FIGS. 11(b) and 11(c). As described above, when the size of the divided area changes according to the load of the GPU, the range information of the dynamically changing divided area is included in the dynamic metadata for each frame and transmitted to the head-mounted display 100.

Figure 12:
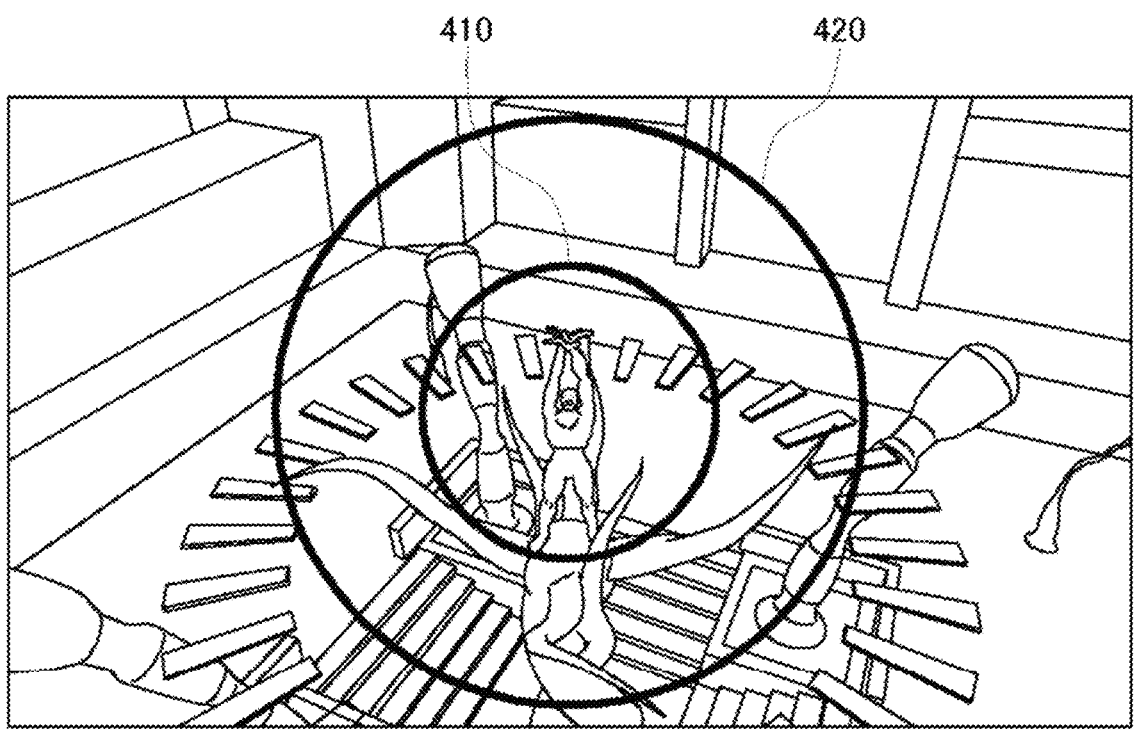
FIG. 12 is a diagram illustrating a gaze area in foveated rendering.

FIG. 12 is a diagram illustrating a gaze area in foveated rendering. There is a method called the foveated rendering, which performs the user's gaze tracking, draws an image with high resolution in the area having the gaze point as the center, and draws an image in the surroundings with low resolution to reduce the image drawn processing load. An image is drawn with high resolution in a central area 410 having the gaze point as the center, with medium resolution in a peripheral area 420 outside the central area 410, and with low resolution on the outer side of the peripheral area 420.

The rendering device 200 transmits an image drawn by the foveated rendering to the head-mounted display 100, and the re-projection unit 60 of the head-mounted display 100 executes re-projection on the image in accordance with the latest position-orientation information L3. When the head-mounted display 100 executes re-projection on an image, information associated with the gaze area in the foveated rendering is necessary. Therefore, the rendering device 200 causes information associated with the gaze area in the foveated rendering, specifically information associated with the position of the gaze point and the radius of the circle of the gaze area, to be included in the dynamic metadata, in addition to the predicted position-orientation information L2, and transmits the information to the head-mounted display 100 in synchronization with the frame data.

FIGS. 13A to 13C are diagrams illustrating how the position of the gaze area in the foveated rendering changes in accordance with the movement of the gaze point. When the gaze point is in the lower left, the gaze area is in the lower left (central area 412 and peripheral area 422) as illustrated in FIG. 13A, and when the gaze point is in the front, the gaze area is in the front (central area 414, peripheral area 424) as illustrated in FIG. 13B, and when the gaze point is in the upper right, the gaze area is in the upper right (central area 416, peripheral area 426) as illustrated in FIG. 13C. As described above, when the position of the gaze area changes according to the position of the gaze point, the position information of the gaze area that dynamically changes is included in the dynamic metadata for each frame and transmitted to the head-mounted display 100.

As in FIGS. 11(a) to 11(c), when the size of the gaze area in the foveated rendering changes according to the GPU load, that is, in the case where the gaze area is widened when the GPU load is small and the gaze area is narrowed as the load increases, the range information of the gaze area that dynamically changes is included in the dynamic metadata for each frame and transmitted to the head-mounted display 100.

FIGS. 14A to 14C are diagrams illustrating how the position of the divided area changes when gaze tracking is combined with the multi-resolution shading. When the gaze point is in the lower left, a fixation area 432 where an image is drawn with high resolution is in the lower left as illustrated in FIG. 14A, and when the gaze point is in front, a fixation area 434 is in the front as illustrated in FIG. 14B, and further when the gaze point is in the upper right, a fixation area 436 is in the upper right as illustrated in FIG. 14C. Thus, when the position of the fixation area changes according to the position of the gaze point, the position information of the fixation area that dynamically changes is included in the dynamic metadata for each frame and transmitted to the head-mounted display 100.

As described above, according to the rendering device 200 of the present embodiment, information necessary for re-projection can be transmitted as dynamic metadata to the head-mounted display 100 in synchronization with image frame data. The head-mounted display 100 can extract information necessary for re-projection from dynamic metadata to apply re-projection to the image frame data. Thereby, VR sickness of the user wearing the head-mounted display 100 can be prevented.

The present invention has been described based on the embodiment. The embodiment is an example, and it will be understood by those skilled in the art that various modifications can be made to combinations of the respective constituent elements and processing processes, and such modifications are within the scope of the present invention. Such modifications are described.

REFERENCE SIGNS LIST

10 Control unit, 20 Input interface, 30 Output interface 32 Backlight, 40 Communication control unit, 42 Network adapter, 44 Antenna, 50 Storage unit, 60 Re-projection unit, 62 Position-orientation difference calculation unit, 64 Orientation sensor, 70 External input/output terminal interface, 72 External memory, 80 Clock unit, 90 HDMI transmission/reception unit, 100 Head-mounted display, 200 Rendering device, 210 Position-orientation acquisition unit, 220 Delay time acquisition unit, 230 Position-orientation prediction unit, 240 Viewpoint-visual line setting unit, 250 Image generation unit, 260 Image storage unit, 270 Metadata generation unit, 280 HDMI transmission/reception unit, 300 Data transmission path, 500 Entire circumferential image.

INDUSTRIAL APPLICABILITY

The present invention can be used for image transmission technology and image correction technology for head-mounted displays.

The invention claimed is:

1. A rendering device wirelessly coupled to a head-mounted display, the rendering device comprising:
    a prediction unit that predicts an orientation of the head-mounted display after delay time has elapsed based on orientation information received wirelessly from the head-mounted display, and outputs predicted orientation information;
    an image generation unit that generates an image to be displayed on the head-mounted display based on the predicted orientation information of the head-mounted display; and
    a transmission unit that transmits the predicted orientation information of the head-mounted display to the head-mounted display in synchronization with frame data of the image,
    wherein the head-mounted display uses the predicted orientation information to re-project the frame data of the image.

2. The rendering device according to claim 1, wherein
    the transmission unit inserts the predicted orientation information of the head-mounted display into a synchronization signal preceding each frame as metadata and transmits the predicted orientation information.

3. A head-mounted display for displaying an image wirelessly transmitted from a rendering device, the head-mounted display comprising:
    a sensor that detects orientation information of the head-mounted display;
    a reception unit that receives frame data of an image to be displayed on the head-mounted display and predicted orientation information of the head-mounted display transmitted in synchronization with the frame data of the image,
    wherein the predicted orientation information is calculated by the rendering device; and
    a re-projection unit that corrects the frame data of the image such that the frame data suits a latest orientation of the head-mounted display based on a difference between latest orientation information detected by the sensor and the predicted orientation information.

4. The head-mounted display according to claim 3, wherein
    the reception unit receives the transmitted predicted orientation information that has been inserted into a synchronization signal of each frame as metadata.

5. The head-mounted display according to claim 4, wherein
    the metadata includes information associated with a position or size of a divided area of multi-resolution shading that dynamically changes according to a processing load or movement of a gaze point, and the re-projection unit corrects the frame data of the image with reference to the information associated with the position or the size of the divided area of the multi-resolution shading.

6. The head-mounted display according to claim 4, wherein the metadata includes information associated with a position or the size of a gaze area of foveated rendering that dynamically changes according to a processing load or movement of a gaze point, and the re-projection unit corrects the frame data of the image with reference to the information associated with the position or the size of the gaze area of the foveated rendering.

7. An image correction method for correcting an image that is wirelessly transmitted from a rendering device and is to be displayed on a head-mounted display, the method comprising:

receiving frame data of an image to be displayed on the head-mounted display and predicted orientation information of the head-mounted display transmitted in synchronization with the frame data of the image, wherein the predicted orientation information is calculated by the rendering device;

detecting latest orientation information of the head-mounted display; and correcting the frame data of the image such that the frame data suits a latest orientation of the head-mounted display based on a difference between the latest orientation information calculated by the head-mounted display and the predicted orientation information calculated by the rendering device.

\* \* \* \* \*